{# 3,357,992
PROCESS FOR PREPARING SULTONES

Ernst Hieronymus, Therese Quadflieg, and Rudolf Wirtz, Frankfurt am Main, Germany, assignors, by mesne assignments, to Farbwerke Hoechst Aktiengesellschaft vormals Meister Lucius & Brüning, Frankfurt am Main, Germany, a corporation of Germany
No Drawing. Filed July 7, 1964, Ser. No. 380,930
Claims priority, application Germany, July 9, 1963, F 40,189
13 Claims. (Cl. 260—327)

Several processes have been disclosed for the preparation of sultones. Sultones can, for example, be obtained from hydroxy-sulfonic acids by dehydration. The latter is the only process described in the relevant literature for preparing sultones of high molecular weight, for example 3-hydroxy-undecane-sulfonic-acid-(1)-sultone. The long-chain hydroxy-sulfonic acids serving as starting materials are obtained by the addition of bisulfite to unsaturated alcohols with terminal double bonds. Until now said process has not gained any importance in industry, since the required unsaturated alcohols can be prepared in general only with difficulties. No method has become known until now which—with the use of industrially accessible α-olefins of high molecular weight—permits preparing by a simple reaction sultones of the same number of carbon atoms.

Now, we have found that sultones of low molecular weight as well as of high molecular weight can be prepared by splitting off the carboxylic acid of the formula RCOOH which corresponds to the acyl radical, from acyloxy-sulfonic acids of the general formula

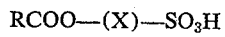

RCOO—(X)—SO$_3$H under conditions which suppress a hydrolytic splitting off of the acid with the formation of hydroxy-sulfonic acid.

In the aforementioned formulae RCOO— represents the radical of a saturated carboxylic acid, in particular of a low molecular aliphatic carboxylic acid, such, for example, as acetic acid, propionic acid, butyric acid and the like. Radicals of aromatic acids, for example of benzoic acid or toluic acid can, however, also be used. X represents a hydrocarbon radical which may belong to the aliphatic, mixed aromatic-aliphatic, aromatic or hydroaromatic series and which may likewise contain substituents. Advantageously, X is intended to be a saturated aliphatic radical having from 3 to 30 carbon atoms.

The 2-acyloxy-alkane-sulfonic acids-(1) of the general formula RCOO—(C$_n$H$_{2n}$)SO$_3$H, which are preferably used as starting substances for the process of the present invention, can be prepared in known manner by reacting α-olefins with mixed anhydrides in saturated carboxylic acid and sulfuric acid, as for example acetyl sulfate. Using olefins of different chain length, for example n-butene-(1), n-pentene-(1), n-hexene-(1), n-dodecene-(1), 2,2-dimethyl-octene-(7), n-hexadecene-(1), n-octadecene-(1), pentacosene-(1), or triacontene-(1) the reaction proceeds smoothly. Often it is not necessary to use the pure acyl sulfate for the process of the invention, but the reaction of the α-olefins can also be carried out with a mixture of carboxylic acid and sulfur trioxide or with a mixture of carboxylic acid anhydride and sulfuric acid. Acyloxy-sulfonic acids derived from aromatically substituted olefins, such for example as 6-phenyl-hexene-(1) or 6-phenyl-heptene-(1) can also be used according to the process of the present invention. For the preparation of sultones there may of course also be used those acyloxy-sulfonic acids that are obtained according to other methods, for example 3-acetoxy-propane-sulfonic acid-(1) or o-(acetoxy-methyl)-benzene-sulfonic acid.

The acid of the formula RCOOH can be split off under various conditions. It is advantageous to perform the splitting off by a thermal treatment under mild conditions, for example under reduced pressure or in the presence of an inert solvent, such for example as p-xylene, glycol-monobutyl ether; a halobenzene, in which case halogen is chlorine or bromine; in particular 1,2-di-chlorobenzene which possesses a higher boiling point than the acid to be split off, or which acts as an entraining agent for the acid. Catalysts can also be added. Reaction conditions under which the acid is hydrolytically split off with the formation of hydroxy-sulfonic acid, must be avoided, since the yield is otherwise reduced. Hydroxy-sulfonic acids, which are undesired by-products, are formed, for example, when operating in the presence of water. The temperature to be used for splitting off the acid varies within wide limits. It depends on the constitution of the acyloxy-sulfonic acid used, the boiling point of the acid to the split off and other factors. In general, the required required temperatures are in the range of 100° C. and 250° C., preferably 120° C.–200° C. It is advantageous to use acetoxy-alkane-sulfonic acids because of the low boiling point of the acetic acid to be removed and because these compounds can be easily obtained from α-olefins.

The formed sultones, which can either be liquid or solid, are removed from the reaction mixture in different ways. Sultones of a relatively low boiling point can be distilled directly from the reaction mixture, whereas sultones of a higher boiling point can be isolated by extraction or crystallization or other suitable methods. The acid which is split off and removed from the reaction mixture can be used again for the formation of acyl-sulfonic acids. The inert solvent which is used if desired, can also be used again. In addition to the sultones formed, the reaction mixtures may in some cases contain unsaturated sulfonic acids which can, in general be separated without difficulties from the sultones according to the aforementioned working methods.

The process of the present invention is distinguished by the fact that according to it α-olefins of different chain length can be converted into the corresponding sultones, since the acyloxy-alkane-sulfonic acids used for splitting off the acid can generally be obtained in a smooth reaction from α-olefins.

The sultones themselves can be used in industry as antistatics or as hardening agents for aminoplastics. Since they are very reactive compounds, they can for example be used for sulfo-alkylations which lead to products possessing surface-active properties.

The following examples serve to illustrate the invention, but they are not intended to limit it thereto:

Example 1

50 grams of sulfuric acid (of 100% strength) are added dropwise to 55 grams of acetic acid anhydride at a temperature of 0–5° C. The reaction mixture is diluted with 100 cc. of 1,2-dichlorethane, and n-butene-1 is introduced into it at 20° C. until it is saturated. The reaction mixture is stirred for a further 2 hours at room temperature, then 30 minutes at 35° C. and finally 15 minutes at 40° C. The acetic acid formed in the reaction of the acetic acid anhydride with sulfuric acid, and the solvent are distilled off under reduced pressure. The residue is the crude 2-acetoxy-butane-sulfonic-acid-1 which is used without a further purification for the preparation of sultones.

83 grams of 2-acetoxy-butane-sulfonic-acid-1 are dissolved in 300 cc. of 1,2-dichlorobenzene, and the mixture is heated in a flask provided with a stirrer for 4 hours at 170° C.

The split off acetic acid is continuously distilled off,} the 1,2-dichlorobenzene is removed under reduced pressure and the butane sultone is distilled off under a pressure of 0.03 mm. of mercury. 35.3 grams of butane-sultone are obtained which corresponds to a yield of 61.8% of theory calculated on the 2-acetoxy-butane-sulfonic-acid-1 used.

The butane-sultone possesses a boiling point of 157.5° C. under a pressure of 14 mm. of mercury and the refractive index $n_D^{25}$ 1.4500. Boiling point and refractive index correspond to the values indicated in the relevant literature for the sultone of 3-hydroxy-butane-sulfonic-acid-1.

*Example 2*

110 grams of acetic acid anhydride and 100 grams of sulfuric acid (of 100% strength) are reacted according to the method described in Example 1, and a solution of 227 grams of n-hexadecene-1 in 400 cc. of chloroform is added dropwise to the reaction mixture at 32° C. within 1 hour. The reaction mixture is stirred for a further 30 minutes at 35° C. and for a further 15 minutes at 40° C. The acetic acid and the chloroform are subsequently distilled off under reduced pressure, and 351 grams of the crude 2-acetoxy-hexadecane-sulfonic-acid-1 remain behind as a residue.

146 grams of the crude 2-acetoxy-hexadecane-sulfonic-acid-1 are dissolved in 400 cc. of 1,2-dichlorobenzene and the solution is heated for 5 hours at 170° C. The acetic acid which is split off is distilled off continously. After having subsequently removed the 1,2-dichlorobenzene under reduced pressure, a black-brown crystalline residue remains behind. It is suspended in 1 liter of water and dark-brown, water-soluble parts of it are dissolved. The residue is centrifuged or filtered with suction, washed with water, and after drying there are obtained 50.5 grams of crystalline hexadecane-sultone, which corresponds to a yield of 41.5% of theory calculated on the 2-acetoxy-hexadecane-sulfonic-acid-1 used.

After recrystallization from petroleum ether the hexadecane-sultone melts at 60–61° C. In the presence of water it shows a neutral action, it has the acid number 0 and the saponification number 185 (calculated 184.2). With pyridine a crystalline pyridino-betaine is obtained which melts at 231° C. (corr.) with decomposition.

*Example 3*

On heating 96 grams of 3-acetoxy-propane-sulfonic-acid-1 in 350 cc. of 1,2-dichlorobenzene at 170° C. 30 grams of glacial acetic acid distil off within 5 hours. The remaining residue is subjected to a distillation under reduced pressure and first 1,2-dichlorobenzene and subsequently 49 grams of 1,3-propane-sultone distil over. Yield: 76% of theory. Boiling point and refractive index correspond to the indications in the relevant literature.

*Example 4*

220 grams of acetic acid anhydride are reacted as described in Example 1 with 200 grams of sulfuric acid (of 100% strength). The solution of acetyl sulfate in glacial acetic acid, thus obtained, is then added dropwise to a solution of 170 grams of n-hexene-1 in 800 cc. of chloroform, the temperature of the solution being maintained at 30–32° C. When the dropwise addition is terminated, stirring is continued for a further 30 minutes at 35° C. and a further 15 minutes at 40° C. Glacial acetic acid and chloroform are then distilled off under reduced pressure. 1 liter of 1,2-dichlorobenzene is then added to the crude 2-acetoxy-hexane-sulfonic-acid-(1) which is obtained as residue, it is heated for 5 hours at 170° C. and the split off acetic acid is distilled off continuously. After removing the solvent under reduced pressure, the black viscous residue is subjected to a high vacuum distillation (pressure 0.01 mm. of mercury, temperature of the oil bath 120–140° C.), thereby 181.5 grams of a nearly colorless hexane-sultone distil over, which correspond to a yield of 55% of theory calculated on n-hexene-1 used. By repeated distillation the hexane-sultone is obtained completely colorless with the refractive index $n_D^{20}=1.4624$, the acid number 0.7 and the saponification number 336 (calculated 341).

*Example 5*

The crude 2-acetoxy-decane-sulfonic acid-(1) is prepared from 141.4 grams of n-decene-1 according to the method described in Example 4, the thermal splitting off is carried through at 170° C. in the presence of 500 cc. of 1,2-dichlorobenzene and the solvent is removed after heating for 6 hours by distillation under reduced pressure. By distilling the residue in a high vacuum (pressure 0.03 mm. of mercury, temperature of the oil bath 160° C.) 108 grams of nearly colorless decane-sultone are obtained, which corresponds to a yield of 48.5% of theory, calculated on the α-olefin used. After a repeated distillation the product, which is then completely colorless, has the refractive index $n_D^{20}=1.4631$, the acid number 0.2 and the saponification number 250 (calculated 254).

*Example 6*

2-acetoxy-dodecane-sulfonic-acid-(1) is prepared from 170 grams of n-dodecene-1 according to the method described in Example 4, and the thermal splitting off is carried out at 170° C. in the presence of 500 cc. of 1,2-dichlorobenzene glacial acetic acid. The residue, which remains behind after distilling off the solvent, is abandoned at a temperature of about 0° C., it thereby solidifies as a crystalline mass. In order to remove water soluble components, the residue is suspended in 1 liter of water, centrifuged, filtered with suction to dryness, if desired washed with water and dried. 86 grams of dodecane-sultone are obtained in such a way, which corresponds to a yield of 34.4% of theory, calculated on n-dodecene-1 used. After recrystallization from petroleum ether, the dodecane-sultone melts at 37.5° C., it has the acid number 4.7 (calculated 0), a saponification number of 228 (calculated 226) and a bromine number of 0.1 (calculated 0).

In an analogous manner there are obtained:
(a) Using n-tetradecene-1, tetradecane-sultone of a yield of 38.6% of theory calculated on the n-tetradecene-1 used. After recrystallization from petroleum ether the tetradecane-sultone melts at 52° C. Its acid number is 1.3 (calculated 0), the saponification number is 200 (calculated 203) and the bromine number is 0.1 (calculated 0).
(b) Heptadecane-sultone of a yield of 45% of theory (calculated on the n-heptadecene-1 used) which after recrystallization from ether has a melting point of 57.5° C., the acid number 3 (calculated 0) the saponification number 171 (calculated 176) and the bromine number 0 (calculated 0).
(c) From n-octadecene-1, octadecane-sultone with a yield of 40% of theory, calculated on the n-octadecene-1 used. After recrystallization from petroleum ether or ether, the octadecane-sultone melts at 68.5° C. It has the acid number 3.2 (calculated 0), the saponification number 162 (calculated 169) and the bromine number 0 (calculated 0).

We claim:
1. A process for preparing a sultone which comprises heating at a temperature above 100° C. in absence of water a lower alkanoyloxy sulfonic acid to split off a lower alkylcarboxylic acid which is derived from the lower alkanoyloxy moiety.
2. A process according to claim 1 wherein a lower alkanoyloxy-alkane-sulfonic acid is heated.
3. A process for preparing a sultone which comprises heating at a temperature above 100° C. in absence of water an acetoxy-alkane-sulfonic acid and splitting off the acetic acid derived from the acetoxy moiety.
4. A process as claimed in claim 1, wherein the carboxylic acid, which corresponds to the lower alkanoyl radical, is split off from the lower alkanoyl sulfonic acids by heating said sulfonic acid at a temperature above 100° C. in the presence of an inert organic solvent.

5. A process as claimed in claim 1, wherein the carboxylic acid is split off by heating said sulfonic acid at a temperature above 100° C. in the presence of 1,2-dichlorobenzene.

6. A process as claimed in claim 1, wherein the carboxylic acid, is split off by heating said sulfonic acid at a temperature above 100° C. in the presence of an inert organic solvent under reduced pressure.

7. A process as claimed in claim 1, wherein the carboxylic acid is split off by heating said sulfonic acid at a temperature above 100° C. in the presence of an inert organic solvent under reduced pressure.

8. A process as claimed in claim 1, wherein the carboxylic acid is split off by heating said sulfonic acid at a temperature above 100° C. in the presence of 1,2-dichlorobenzene under reduced pressure.

9. A process as claimed in claim 3, wherein acetic acid is split off from acetoxy-alkane-sulfonic acids by heating said sulfonic acid at a temperature above 100° C. in the presence of an inert organic solvent.

10. A process as claimed in claim 3, wherein acetic acid is split off from acetoxy-alkane-sulfonic acids by heating said sulfonic acid at a temperature above 100° C. in the presence of 1,2-dichlorobenzene.

11. A process as claimed in claim 3, wherein acetic acid is split off from acetoxy-alkane-sulfonic acids by heating said sulfonic acid at a temperature above 100° C. under reduced pressure.

12. A process as claimed in claim 3, wherein acetic acid is split off from acetoxy-alkane-sulfonic acids by heating said sulfonic acid at a temperature above 100° C. in the presence of an inert organic solvent under reduced pressure.

13. A process as claimed in claim 3, wherein acetic acid is split off from acetoxy-alkane-sulfonic acids by heating said sulfonic acid at a temperature above 100° C. in the presence of 1,2-dichlorobenzene under reduced pressure.

References Cited

Helberger, et al.: Annalen der Chemie, vol. 666 (1963), pp. 75–77.

JAMES A. PATTEN, *Primary Examiner.*